United States Patent [19]

Simpson et al.

[11] Patent Number: 5,550,671
[45] Date of Patent: Aug. 27, 1996

[54] INTRA-CAVITY OPTICAL FOUR-WAVE MIXER AND OPTICAL COMMUNICATIONS SYSTEM USING THE SAME

[75] Inventors: Jay R. Simpson, Fanwood, N.J.; Jefferson L. Wagener, Stanford, Calif.; Kenneth L. Walker, New Providence, N.J.

[73] Assignee: Lucent Technologies Inc., Murray Hill, N.J.

[21] Appl. No.: 397,516

[22] Filed: Mar. 2, 1995

[51] Int. Cl.[6] .............................. H01S 3/00; G02F 1/35
[52] U.S. Cl. .................. 359/337; 359/326; 359/328; 385/122
[58] Field of Search .............................. 372/6, 21, 70, 372/18; 359/328, 337, 338, 326; 385/122

[56] References Cited

U.S. PATENT DOCUMENTS

| | | | |
|---|---|---|---|
| 5,243,610 | 9/1993 | Murata | 372/21 |
| 5,386,314 | 1/1995 | Jopson | 359/332 |

OTHER PUBLICATIONS

K. Inoue et al. "Wavelength Conversion Experiment Using Fiber Four–Wave Mixing," *IEEE Photonics Tech. Lett.*, vol. 4, pp. 69–72, (1992).

S. Watanabe et al. "Compensation of Chromatic Dispersion in a Single–mode Fiber by Optical Phase Conjugation," *Photonics Tech. Lett.*, 5, pp. 91–95, (1993).

P. Andrekson et al. "16 Gbit/s All–Optical Demultiplexing Using Four–Wave Mixing,"*Elect. Lett.*, vol. 27, pp. 922–924 (1991).

R. M. Jopson et al. "Polarisation–independent Phase Conjugation of Lightwave Signals," *Elect. Lett.*, vol. 29, No. 25, pp. 2216–2217 (1994).

K. Kikuchi et al. "Design of Highly Efficient Four–Wave Mixing Devices Using Optical Fibers," *IEEE Photonics Tech. Lett.*, vol. 6, No. 8, pp. 992–994 (1994).

H. Po et al. "High Power Neodymium–Doped Single Transverse Mode Fibre Laser," *Elect. Lett.*, 29, pp. 1500–1501, (1993).

*Primary Examiner*—Mark Hellner
*Attorney, Agent, or Firm*—Glen E. Books

[57] ABSTRACT

In accordance with the invention, an optical four-wave mixer for producing a phase-conjugated signal comprises a source of optical input signals, a fiber laser for receiving the signals, and a detector for selectively detecting the frequency-shifted signals produced by four-wave mixing. The laser can be a rare-earth doped fiber laser with a fiber cavity phase matched to the input signals. The frequency-shifted output signals have an inverted spectral waveform as compared with the input signals. The mixer can be made in compact form with a cavity length as small as 100 m and can provide inverted signals at the same intensity as the input signals, making the mixer particularly useful for providing spectral inversion in an optical communications system.

10 Claims, 1 Drawing Sheet

INTRA-CAVITY OPTICAL FOUR-WAVE MIXER AND OPTICAL COMMUNICATIONS SYSTEM USING THE SAME

FIELD OF THE INVENTION

This invention relates to a device for efficient optical four-wave mixing. It is particularly useful for reversing the effect of dispersion in an optical communications systems.

BACKGROUND OF THE INVENTION

Optical communications systems are becoming increasingly important in the high speed transmission of large amounts of information. A typical optical communications system comprises a source of modulated optical input signals, a length of optical fiber coupled to the source, and a receiver for optical signals coupled to the fiber. The input signals are typically in the form of digital pulses which are transmitted with minimum attenuation in guided modes along the axis of the fiber.

One difficulty with optical communications systems is dispersion. Different wavelength components of a pulse are transmitted with slightly different facility with the consequence that a sharp, symmetrical pulse at the input, after traveling many kilometers, becomes deformed and unsymmetrical. In the absence of preventative measures, a pulse will eventually degrade to a point where its initial location in a binary sequence is indeterminate.

It has been proposed that dispersion can be reduced by midspan spectral inversion of propagating pulses, i.e. at the midpoint of the fiber path inverting the pulse waveform so that the higher frequency portion has the shape of the lower frequency portion and vice versa (effectively a 180° rotation of the pulse waveform about its center wavelength). As a result, after the inverted pulse travels over the second half of the communications path, the additional dispersion will reverse much of the distorting effect of the dispersion that occurred during the first half.

One approach to spectral inversion is through the use of a phenomenon known as four-wave mixing. When the pulse is co-propagated along a fiber with high power (5–50 mW) narrow band light near the pulse wavelength, a second pulse is produced at a wavelength slightly different from the original pulse. The frequency-shifted second pulse has an inverted waveform as compared to the initial pulse. Unfortunately, the four-wave mixing arrangements heretofore known require tens of kilometers of co-propagation and produce inverted pulses 10–25 dB down from the input pulse. Accordingly, there is a need for an improved four-wave mixer providing a stronger inverted pulse in a more compact arrangement.

SUMMARY OF THE INVENTION

In accordance with the invention, an optical four-wave mixer for producing a phase-conjugated signal comprises a source of optical input signals, a fiber laser for receiving the signals, and a detector for selectively detecting the frequency-shifted signals produced by four-wave mixing. The laser can be a rare-earth doped fiber laser with a fiber cavity phase matched to the input signals. The frequency-shifted output signals have an inverted spectral waveform as compared with the input signals. The mixer can be made in compact form with a cavity length as small as 100 m and can provide inverted signals at the same intensity as the input signals, making the mixer particularly useful for providing spectral inversion in an optical communications system.

BRIEF DESCRIPTION OF THE DRAWINGS

The advantages, nature and various features of the invention will appear more fully upon consideration of the illustrative embodiments now to be described in detail in connection with the accompanying drawings. In the drawings.

It is to be understood that these drawings are for purposes of illustrating the concepts of the invention and, except for graphs, are not to scale.

DETAILED DESCRIPTION

Figure 1:
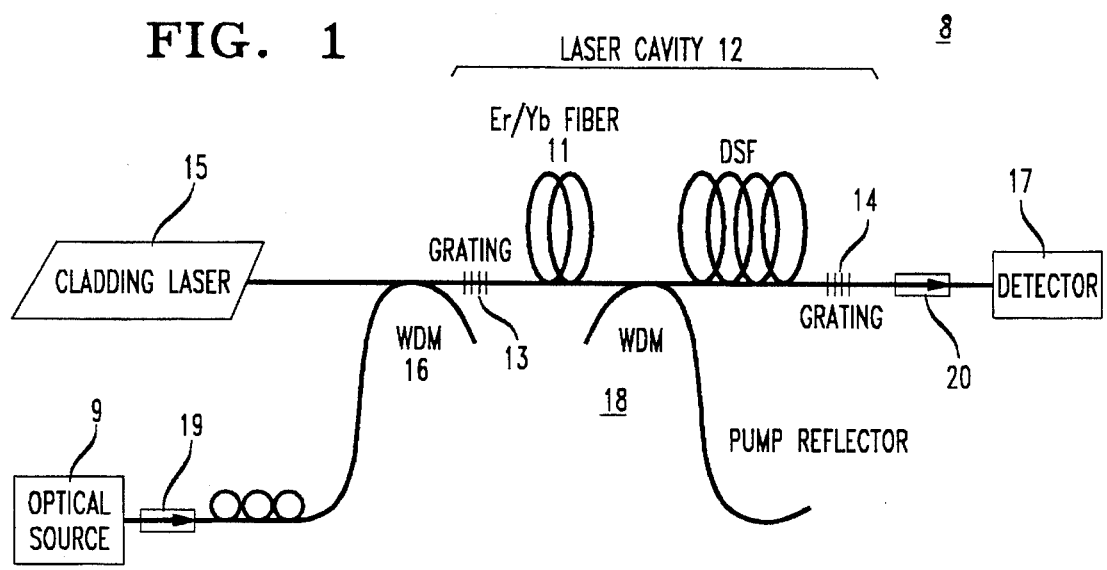
FIG. 1 is a schematic diagram of an optical four-wave mixer in accordance with one embodiment of the invention.

Referring to the drawings, FIG. 1 is a schematic diagram of an optical four-wave mixer 8 comprising a source 9 of optical input signals of center wavelength $\lambda$, a fiber laser for receiving the input signals, and, a detector 17 provided downstream of the laser for selectively responding to the frequency-shifted four-wave mixing signals produced in the laser cavity. In typical applications the source will provide a digitally modulated sequence of input pulses at a constant repetition rate.

The laser can be composed of a rare-earth doped fiber 11, a laser cavity 12 defined by a pair of fiber Bragg gratings 13 and 14 and a pumping source 15. In this particular embodiment, a coupler 16 is provided for supplying input optical signals to the laser, and a coupler-reflector arrangement 18 is provided for reflecting pump radiation back through the rare-earth doped fiber. The center wavelength of the laser should be different from the signal wavelength $\lambda$ so that the input signal, the laser light, and the mixing signal can all be separated, but the laser wavelength should also be within $\pm 10\%$ of $\lambda$. Isolators 19 and 20 are advantageously provided to prevent reflection back into the input source and the laser cavity.

Preferably, the rare-earth doped fiber is Er/Yb fiber, the pumping source is a 1060 nm Nd cladding laser, and the laser cavity comprises 100 m to 5 km of dispersion shifted fiber. The Bragg gratings can be two 0.5 nm wide fiber grating reflectors tuned to resonate at the minimum dispersion wavelength (1535 nm) of a 1 km length of dispersion shifted fiber. The detector can utilize a Fabry-Perot filter to selectively transmit the mixing pulses. For maximum conversion efficiency, the cavity is phase matched with the input signals as by choosing the minimum dispersion wavelength of the dispersion shifted fiber equal to the input wavelength $\lambda$.

In typical operation, a sequence of input pulses at a constant repetition rate are fed into the laser cavity. The laser output, prior to filtration, includes the input pulses, laser light, and four-wave mixing pulses which are inverted (conjugated) as compared with the input pulses and frequency-shifted to the other side of the laser light in a spectral diagram.

The device can be operated with the laser in either continuous wave operation or with the cavity adapted for mode-locked operation. For an input pulse source, the laser is preferably mode-locked at a repetition rate equal to the input pulse repetition rate, some integral multiple n of the repetition rate, or some integral fraction ½ of the repetition rate. In the continuous wave case, each input signal will generate a four-wave mixed output signal. In the mode-locked case, them can be a mixed pulse for each input pulse or for every nth pulse.

Figure 2:
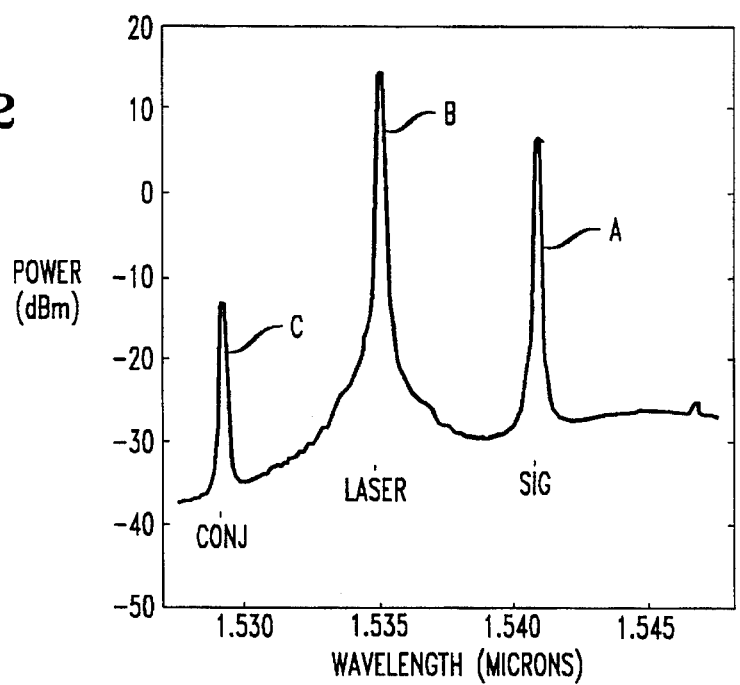
FIG. 2 is a spectral diagram showing the various optical signals associated with the operation of the device of FIG. 1.

FIG. 2 is a spectral diagram of unfiltered output showing an input signal A, the laser light B and the conjugated output signal C. While the input signal here is at a longer wavelength than the laser, it can also be at a shorter wavelength. In general, when propagating through the erbium fiber prior to the dispersion shifted fiber, higher conversion efficiency is gained when the input signal is on the long wavelength side of the laser. When the input signal propagates through the dispersion shifted fiber first, the conversion efficiency is greater for an input signal on the short wavelength side of the laser. In general, the greater the frequency shift, the lower the conversion efficiency. The highest conversion efficiency was observed for an input signal traveling through the Yb/Er first, with 1060 nm pump power of 2.4 watts. Conjugate conversion efficiency as high as OdB was observed for a shift of 9.8 nm.

Figure 3:
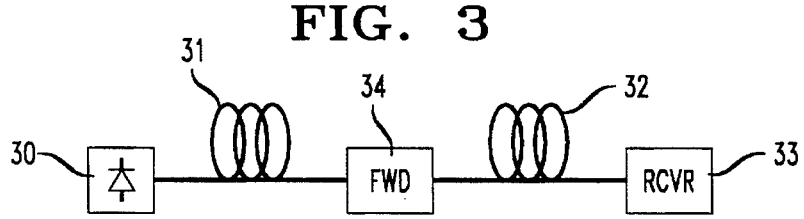
FIG. 3 is a schematic diagram of an optical communications system employing the device of FIG. 1 for spectral inversion.

FIG. 3 is a schematic diagram of the preferred use of the FIG. 1 device for the spectral inversion of propagating signals in an optical communications system. Specifically, FIG. 3 illustrates an optical communication's system comprising a source 30 of modulated optical input signals, a first optical path 31, such as a length of optical fiber and a second optical path 32 through a similar optical medium to receiver 33 of optical signals. Disposed between similar, approximately equal optical paths is a four-wave mixing device 34 of the type shown in FIG. 1 for conjugating the spectral form of propagating signals. The effects of dispersion in the path from 31 are thus inverted, and these effects are essentially reversed as the conjugated pulses travel over a similar path 32 to the receiver. The receiver is adapted for selectively detecting the frequency-shifted, conjugated signals produced by four-wave mixing.

The subject four-wave mixing device can also be modified for parametric amplification of the input signals. In this instance, the detectors, or receivers of the system are adapted to selectively utilize the amplified signal of wavelength $\lambda$ (peak A of FIG. 2) rather than the conjugate signal (peak C).

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. Article comprising four-wave mixing means comprising:

a) an input adapted for receiving signal radiation of first wavelength $\lambda$;

b) an output;

c) a first optical fiber transmission path connecting said input and said output, said first optical fiber transmission path comprising rare earth-doped optical fiber and dispersion-shifted optical fiber; and d) a pump radiation input adapted for receiving pump radiation of a second wavelength, said second wavelength being different from $\lambda$; wherein e) the first optical fiber transmission path further comprises wavelength-dependent reflecting means that define an optical cavity for a radiation of a third wavelength different from $\lambda$ and the second wavelength, said optical cavity including at least a portion of each of said rare earth-doped optical fiber and of said dispersion-shifted optical fiber, said optical cavity being adapted for generation, by four-wave mixing, of radiation of wavelength within 10% of $\lambda$.

2. Article according to claim 1, wherein the dispersion-shifted optical fiber within the optical cavity has a length in the range 100 m to 5 km.

3. Article according to claim 1, wherein the rare earth-doped optical fiber comprises Er.

4. Article according to claim 3, wherein the rare earth-doped optical fiber further comprises Yb.

5. Article according to claim 1, wherein the dispersion-shifted optical fiber has a minimum dispersion at about 1535 nm.

6. Article according to claim 1, wherein said wavelength-dependent reflecting means comprise a pair of fiber Bragg gratings.

7. Article according to claim 1, wherein the article is an optical fiber communication system comprising a transmitter, a receiver spaced apart from the transmitter, a source of said pump radiation, and a second optical fiber transmission path connecting said transmitter and receiver, said second optical fiber transmission path comprising the first optical fiber transmission path.

8. Optical fiber communication system according to claim 7, wherein said first optical fiber transmission path is disposed such that the portions of the second optical fiber transmission path between the first optical fiber transmission path and, respectively, the transmitter and the receiver have substantially equal dispersion effects at wavelength $\lambda$.

9. Optical fiber communication system according system according to claim 7, further comprising a filter for selectively permitting passage of a mixing signal.

10. Optical communication system according to claim 9, wherein $\lambda$, is about 1541 nm, the second wavelength is about 1060 nm, and the third wavelength is about 1535 nm.

* * * * *